United States Patent [19]

Sandau et al.

[11] 4,096,787

[45] Jun. 27, 1978

[54] CYLINDER-AND-PISTON ARRANGEMENT AND METHOD OF MANUFACTURING THE SAME

[75] Inventors: Hartmut Sandau, Moglingen; Wilhelm Weigert, Schwieberdingen; Winfried Steinel, Königsfeld; August Kraisel, Bittenfeld; Klaus Ritter, Stuttgart; Erwin Gaub, Zweibrücken; Heinrich Kochendörfer, Rommelshausen, all of Germany

[73] Assignee: Robert Bosch GmbH, Stuttgart, Germany

[21] Appl. No.: 730,713

[22] Filed: Oct. 8, 1976

[30] Foreign Application Priority Data

Dec. 5, 1975 Germany .............................. 2554748

[51] Int. Cl.² .......................... B23P 15/10; F16J 1/12
[52] U.S. Cl. .............................. 92/260; 29/156.5 A; 403/157; 403/271
[58] Field of Search ................. 92/231, 260; 403/271, 403/272, 157; 29/156.5 A; 228/112

[56] References Cited

U.S. PATENT DOCUMENTS

| 740,865 | 10/1903 | Jenkins | 403/157 |
| 1,647,252 | 11/1927 | Russell | 29/156.5 A |
| 2,566,646 | 9/1951 | Whitaker | 403/271 X |
| 3,596,570 | 8/1971 | Kenyon | 92/260 X |
| 3,631,585 | 1/1972 | Stamm | 228/112 |

FOREIGN PATENT DOCUMENTS

229,634  10/1963  Austria .............................. 228/112

*Primary Examiner*—Irwin C. Cohen
*Attorney, Agent, or Firm*—Michael J. Striker

[57] ABSTRACT

A piston rod connected at one end to a piston slidably arranged in a cylinder projects with its other end through an opening in an end wall of the cylinder beyond the latter and a fork-shaped member is connected by a friction weld, that is without adding welding material or external heat, to the other end of the piston rod.

11 Claims, 5 Drawing Figures

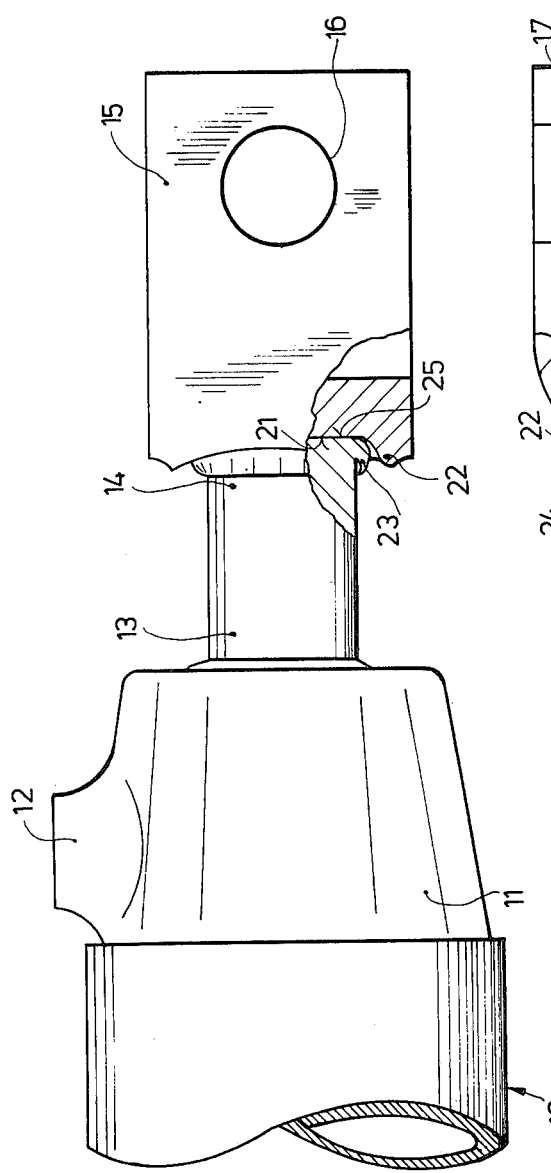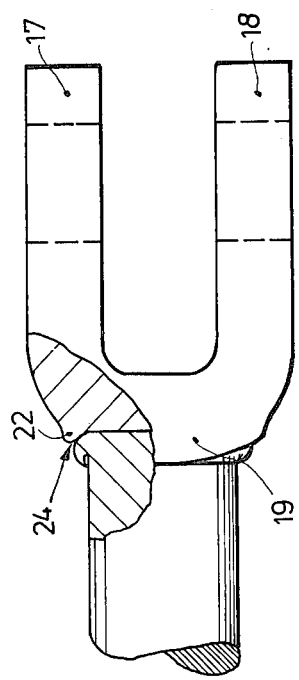

CYLINDER-AND-PISTON ARRANGEMENT AND METHOD OF MANUFACTURING THE SAME

BACKGROUND OF THE INVENTION

The present invention relates to a cylinder-and-piston arrangement in which a piston slidably arranged in a cylinder has a piston rod projecting with one end through an opening in an end wall of the cylinder and in which a fork-shaped member is connected by welding to the projecting end of the piston rod.

In a known arrangement of this type, the fork-shaped member is a forged part which is provided at its bottom with a blind bore into which a portion of reduced diameter of the piston rod extends. The piston rod and the fork-shaped member are thus arranged along a common axis. The piston rod and the fork-shaped member are further connected by an annular weld seam extending circumferentially of the piston rod. This known construction has the disadvantage that it is relatively expensive, especially since the fork-shaped member is a forged part and the weld seam requires additional welding material.

A cylinder-and-piston arrangement is further known in which the cylinder comprises a central tubular section and two opposite cylinder heads connected to the tubular section of the cylinder by friction welding. Connecting nipples for feeding pressure medium to opposite sides of the piston into the cylinder are also connected by friction welding to the tubular section of the cylinder. For connecting the fork-shaped member to the free end of the piston rod, the latter is provided at its free end with an external screw thread engaging an internal screw thread in the fork-shaped member, or the fork-shaped member is connected by means of a snap ring to the piston rod. The fork-shaped member itself is formed by machining the various faces thereof. This construction is likewise relatively expensive and can be produced only by time-consuming machining operations.

SUMMARY OF THE INVENTION

It is an object of the present invention to provide a cylinder-and-piston arrangement of the aforementioned kind which avoids the disadvantages of such cylinder-and-piston arrangements known in the art, as well as a method of manufacturing such a cylinder-and-piston arrangement which is simpler and less expensive than such methods known in the art.

This is obtained according to the present invention in that the fork-shaped member is constituted by a bent flat strip of steel and connected to the projecting end of the piston rod by a friction weld. This will result in a cylinder-and-piston arrangement which can be constructed in a very simple, inexpensive manner in which the fork-shaped member is simply bent from a flat steel strip and fixedly connected to the end of the piston rod by a friction weld. Expensive machined parts and additional welding material are avoided in the construction according to the present invention and time-consuming additional manufacturing and finishing steps become unnecessary. In addition, since the full cross section of the piston rod is fixedly connected by the friction weld to the fork-shaped member, greater forces can be transmitted between the fork-shaped member and the piston rod than can be transmitted in arrangements in which the piston rod is connected to the fork-shaped member by an annular weld seam.

An especially advantageous construction is derived when the fork-shaped member is provided in its curved bottom part with a planar circular welding face produced by material deforming technique, that is without a cutting or material removing operation. The fork-shaped member in this construction can have two leg portions which are relatively closely arranged to each other, even though a relatively thick, flat strip may be used for its production.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a partial, partially sectioned side view of the cylinder-and-piston arrangement according to the present invention;

FIG. 2 is a partial, partially sectioned top view of the fork-shaped member and part of the piston rod;

DESCRIPTION OF THE PREFERRED EMBODIMENT

Figure 5:
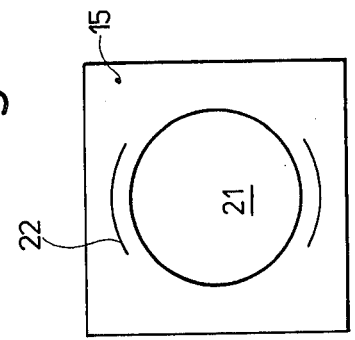
FIG. 5 is a bottom view of the fork-shaped member, in which in FIGS. 3 – 5 the fork-shaped member is shown before its connection to the piston rod.
Figure 3:
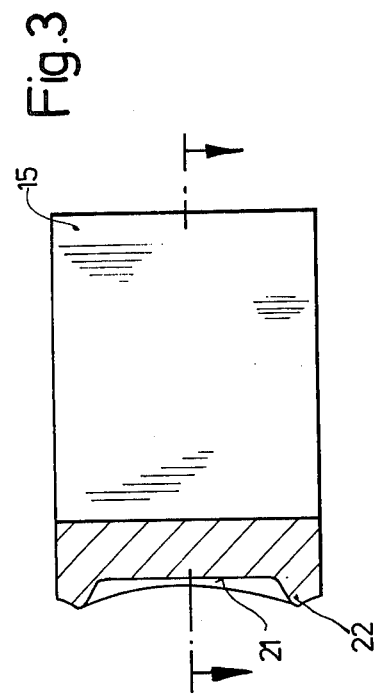
FIG. 3 is a longitudinal cross section through the fork-shaped member.
Figure 4:
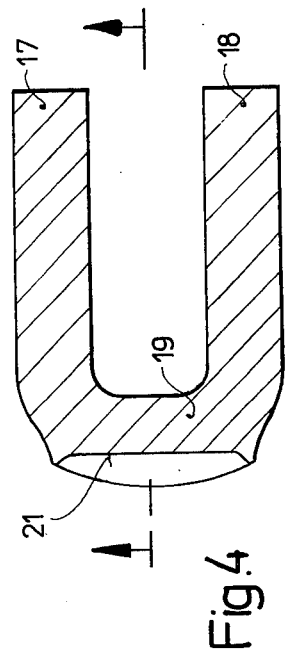
FIG. 4 is a transverse cross section through the fork-shaped member.

FIG. 1 partially illustrates a hydraulic cylinder 10 in which a piston P is arranged and in which the cylinder head 11 is provided with a connection 12 for feeding pressure fluid into and out from the cylinder. A piston rod 13 projects in a usually sealed manner, not shown in the drawing, beyond the cylinder head 11 and a piston P is fixedly connected, in any known manner, to the inner end of the piston rod 13. The piston rod 13 carries at its end 14, projecting beyond the cylinder head 11, a fork-shaped member 15 connected by a friction weld, as will be described later on in detail, to the end 14 of the piston rod. The fork-shaped member 15 has two parallel legs 17 and 18 which are connected to each other by a curved bottom part 19 and which is provided in its legs with two coaxial bores 16. The fork-shaped member 15 is bent from a strip of flat steel. In its bottom part 19 there is provided a planar circular welding face 21 which is surrounded by a rim 22 having an inner conical surface.

This rim 22 will assure that during the friction welding, a friction welding bead 23, forming on the free end of the piston rod, will curl against the circumferential surface of the latter in the region of the free end so that finishing of the friction weld at its peripheral region 24 becomes unnecessary. The piston rod 13 itself has at its free end 14 a planar welding face 25 of a diameter which is smaller or equal to the diameter of the welding face 21 at the bottom part 19 of the fork-shaped member.

The above-described construction is produced in the following manner:

A flat strip of steel is bent into fork shape and during such bending, or immediately thereafter, the planar welding face 21 at the bottom part 19 of the fork-shaped member is formed by material deforming technique, that is by a pressing or a hammering operation without removing material from the fork-shaped member. This formation of the welding space 21 may be carried out while the fork-shaped member is in cold or in hot condition and, due to a suitable shape of the forming member, there will be formed a rim 22 of conical inner surface about the planar circular welding face 21. In this way it is possible to form the welding face 21 planar and of relatively large diameter, even if the legs 17 and 18 of the fork-shaped member are relatively close to each other and the bottom portion 19 thereof is extensively curved. The piston rod 13 with its planar welding face 25, or the fork-shaped member with its planar welding face 21 is then rotated at high speed about its axis and the two parts are pressed against each other with considerable force. Due to the relative movement of one of the aforementioned members through a predetermined time, the necessary heat for welding the two members to each other is thus produced, so that, after the rotating member is arrested while the two members are pressed with considerable force against each other, the piston rod is connected by a friction weld over its whole cross section with the fork-shaped member. The thereby resulting friction weld bead 23 on the piston rod will curl against the peripheral surface of the end 14 of the latter so that a finishing operation at the portion 24 of the friction weld will not be necessary.

It will be understood that each of the elements described above, or two or more together, may also find a useful application in other types of cylinder-and-piston arrangements, differing from the types described above.

While the invention has been illustrated and described as embodied in a cylinder-and-piston arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of forming a fork-shaped member and of connecting the same to one end of a piston rod projecting outwardly of a cylinder and connected at the other end with a piston, comprising the steps of bending without twisting a flat steel strip into a fork-shaped member having a base portion and a pair of parallel leg portions projecting parallel to each other and substantially normal to the base portion from opposite ends of the latter to one side thereof; forming in said base portion midway between said opposite ends a substantially circular depression extending from the other side of the base portion into the latter and having a planar end face; abutting said one end of said piston rod against said planar end face; and friction welding said one end of said piston rod to said end face to fixedly connect said fork-shaped member to said piston rod.

2. A method as defined in claim 1, wherein said depression is formed by material deforming technique.

3. A method as defined in claim 2, wherein forming said depression is carried out subsequently to the bending of said flat steel strip.

4. A method as defined in claim 2, wherein forming of said depression is carried out simultaneously with the bending of said flat steel strip while the latter is in cold condition.

5. An arrangement of the character described comprising a cylinder; a piston in said cylinder having a piston rod projecting with one end thereof beyond one end of said cylinder; a fork-shaped member having a curved bottom portion against which said one end of said piston rod abuts, said fork-shaped member being constituted by a flat steel strip bent without twisting into U-shaped configuration; and a friction weld connecting said one end of said piston rod with said bottom portion of said fork-shaped member.

6. An arrangement as defined in claim 5, wherein said flat steel strip is of rectangular outline having substantially parallel side faces.

7. An arrangement as defined in claim 5, wherein said curved bottom portion of said fork-shaped member is formed at the side thereof facing the cylinder with a central depression having a planar circular end face forming a welding face against which said one end of said piston rod abuts.

8. An arrangement as defined in claim 7, wherein said planar circular end face is at least along part of its circumference surrounded by a rim having an inner conical surface.

9. An arrangement as defined in claim 5, wherein the diameter of said circular end face is at least equal to the diameter of said one end of said piston rod.

10. An arrangement as defined in claim 5, wherein said fork-shaped member has a pair of substantially parallel legs defining a free space therebetween and wherein the diameter at said one end of said piston rod is larger than the width of said free space.

11. An arrangement as defined in claim 5, wherein said one end of said piston rod has a planar end face forming a welding face in engagement with said bottom portion of said fork-shaped member.

* * * * *